Dec. 31, 1929.　　　A. C. GARDNER　　　1,742,066
FOOD CONTAINER
Filed July 21, 1927
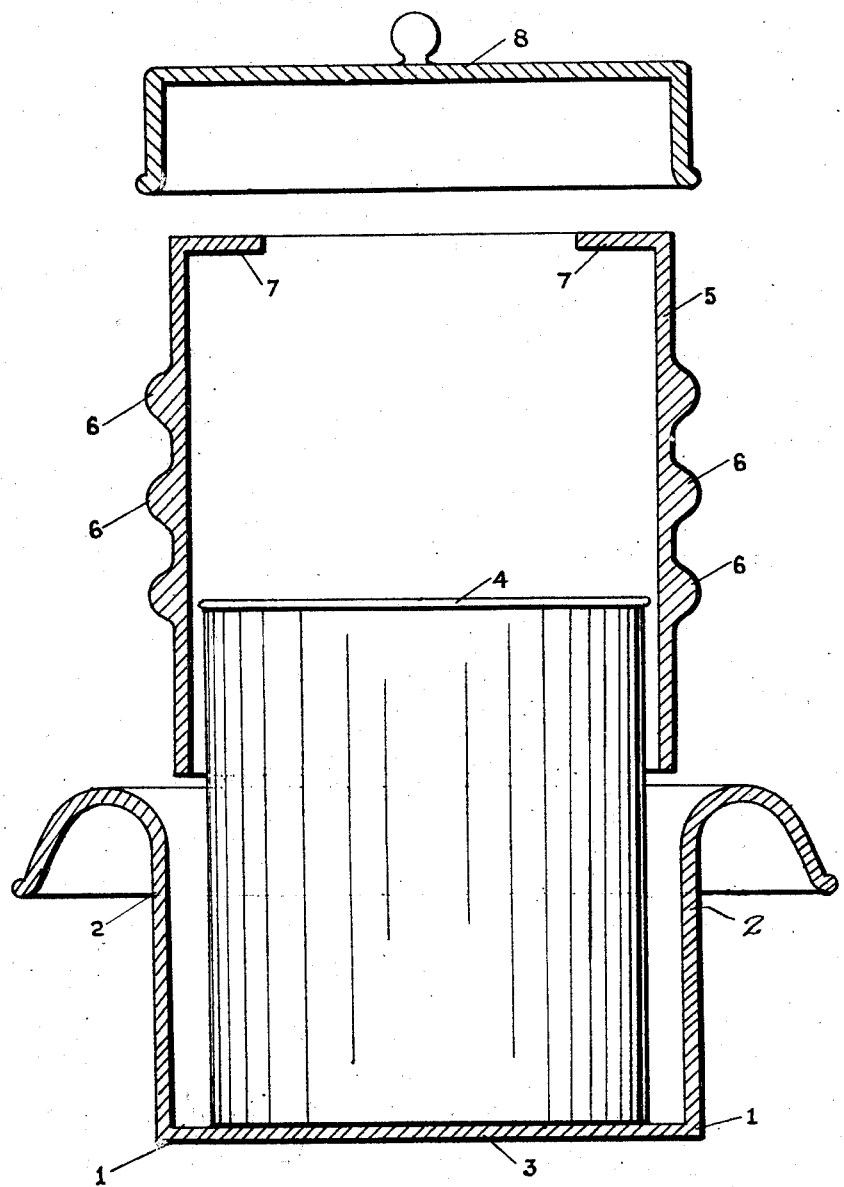
Inventor
Alfred C. Gardner Patented Dec. 31, 1929

1,742,066

UNITED STATES PATENT OFFICE

ALFRED CHARLES GARDNER, OF CARDIFF, WALES

FOOD CONTAINER

Application filed July 21, 1927. Serial No. 207,467.

My invention relates to improvements in hygienic containers of the type to contain open tins or jars, the contents of which are milk, jam, meat, fish, loose cigarettes, tobacco and the like. The invention consists of what may be called a telescopic receptacle having a base and cover and is intended to keep the contents of the tin free from dirt and dust and from flies, beetles, cockroaches, ants and like pests.

The tins when opened are placed within the device and may be readily extracted when empty. The tins are not directly handled and are thereby prevented from becoming dirty and unsightly.

The invention comprises a cylindrical stand with a rim or raised edge and the tin of milk or other food when opened is placed upon the base of the cylindrical stand. A cylindrical casing is passed over the tin and is placed within the rim or raised edge and the casing held firmly in the rim by means of a corrugation formed on the outer circumference of the casing. The upper end of the casing has preferably an inner flange and is further provided with a freely fitting cover.

The cover and casing may be double walled to contain either heating or cooling elements.

My invention is illustrated in the accompanying drawing which presents a side view of my container.

The cylindrical stand 1 has a rim or raised edge 2 and a base plate 3. The stand may be provided with legs and have its base plate perforated. An opened tin 4 of milk or other substance is placed in the centre of the said base plate 3 and the cylinder 5 passed over the tin 4 and secured within the rim or raised edge 2, this edge may of course have any kind of configuration to make it look decorative. The cylinder 5 may be made with double walls and of any depth to contain any heating or cooling elements and may have an opening and cock by which hot or cold water may be introduced and poured out.

The outer circumference of the cylinder 5 is provided with corrugations 6 and these corrugations bear against the inner surface of the rim or edge 2 and the cylinder is fitted thereon so that the inner flange 7 of the cylinder 5 bears against the top of the tin when necessary, this flange 7 shields the rough edges of the cut top surface of the tin 4 as well as prevents the substance contained in the tin running down the outside of the tin. The flange may be attached to a loose piece and be seated on the upper edge of the cylinder. The cylinder is provided with a cover 8 fitting over the cylinder.

Having now particularly described and ascertained the nature of my said invention and in what manner the same is to be performed, I declare that what I claim is:—

1. In a table receptacle for food in a can, a base bowl having an upstanding side wall outwardly flared peripherally at the top, a cylindrical can-enveloping member loosely telescoping into said base bowl and having a circumferential corrugation fitting the flare of said base bowl by which said can-enveloping member is secured to said base bowl, said can-enveloping member having an inwardly extending flange around its upper edge, defining a central opening, and a lid having a peripheral flange loosely fitting over the top of said can-enveloping member.

2. In a table receptacle for food in a can, a base bowl having an upstanding side wall outwardly flared peripherally at the top, said wall being double, forming a chamber, a cylindrical can-enveloping member loosely telescoping into said base bowl and having a circumferential corrugation fitting the flare of said base bowl by which said can-enveloping member is secured to said base bowl, said can-enveloping member having an inwardly extending flange around its upper edge, defining a central opening, and a lid having a peripheral flange loosely fitting over the top of said can-enveloping member.

In testimony whereof I affix my signature.

ALFRED CHARLES GARDNER.